US011713075B2

United States Patent
Joshi et al.

(10) Patent No.: US 11,713,075 B2
(45) Date of Patent: Aug. 1, 2023

(54) TRACK DEVIATION SENSING MECHANISM

(71) Applicant: DEERE & COMPANY, Moline, IL (US)

(72) Inventors: Shrikant Joshi, Kolhapur (IN); Sheik Syed, Madurai (IN); Jayath Menon, Pune (IN); Thiemo Flebbe, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 59 days.

(21) Appl. No.: 17/445,626

(22) Filed: Aug. 23, 2021

(65) Prior Publication Data

US 2022/0089220 A1 Mar. 24, 2022

(30) Foreign Application Priority Data

Sep. 18, 2020 (EP) .................... 20196967

(51) Int. Cl.
*B62D 15/02* (2006.01)
*B62D 1/16* (2006.01)
*F16B 2/24* (2006.01)
*F16D 1/10* (2006.01)

(52) U.S. Cl.
CPC .......... *B62D 15/0215* (2013.01); *B62D 1/16* (2013.01); *F16B 2/243* (2013.01); *F16D 1/10* (2013.01); *F16D 2001/103* (2013.01)

(58) Field of Classification Search
CPC .. F16D 2001/103; B62D 1/16; B62D 15/0215
See application file for complete search history.

(56) References Cited

U.S. PATENT DOCUMENTS 5,807,180 A * 9/1998 Knodle ................ F16D 1/0882
464/144
6,236,119 B1 5/2001 Bonn et al.
(Continued)

FOREIGN PATENT DOCUMENTS

AU 2010330482 B2 12/2013
DE 102008062416 A1 7/2010
(Continued)

OTHER PUBLICATIONS

European Search Report in European Patent Application No. 20196967. 2, dated Feb. 25, 2021, 7 pages.

*Primary Examiner* — Paul N Dickson
*Assistant Examiner* — Maxwell L Meshaka

(57) ABSTRACT

A track deviation sensing mechanism for a steering column includes a sleeve having an inner wall and an outer wall defining an annular opening. The inner wall defines a plurality of internal splines and the sleeve receives the steering column. A sensor has a first axial opening, and a ring is disposed within the first axial opening. The ring defines a second axial opening for accommodating the sleeve. A first part is functionally disposed between the sleeve and the ring such that the first part is lockingly connected to the sleeve and the ring. The first part has a third axial opening. A second part has a fourth axial opening and locks the sensor and the first part at a prerequisite configuration. The first axial opening, the second axial opening, the third axial opening, the fourth axial opening and the annular opening are coaxial.

16 Claims, 4 Drawing Sheets

(56) References Cited

U.S. PATENT DOCUMENTS

| | | | |
|---|---|---|---|
| 7,758,363 B2* | 7/2010 | Tanaka | G01D 5/145 |
| | | | 439/15 |
| 8,390,276 B2* | 3/2013 | McDonald | G01D 5/145 |
| | | | 324/207.25 |
| 9,403,554 B2 | 8/2016 | Henning et al. | |
| 10,081,386 B2* | 9/2018 | Toyama | B62D 6/10 |
| 10,862,382 B2* | 12/2020 | Sorensen | G01D 5/2073 |
| 11,014,594 B2* | 5/2021 | Forte | B62D 1/166 |
| 2008/0000712 A1* | 1/2008 | Tanaka | B62D 15/0215 |
| | | | 73/117.02 |
| 2012/0074808 A1* | 3/2012 | McDonald | B62D 6/10 |
| | | | 310/254.1 |
| 2016/0223361 A1 | 8/2016 | Rachui et al. | |
| 2018/0029634 A1* | 2/2018 | Toyama | B62D 5/0481 |
| 2018/0339729 A1* | 11/2018 | Berner | G01L 3/101 |
| 2018/0340853 A1* | 11/2018 | Berner | B62D 15/0215 |
| 2019/0052159 A1* | 2/2019 | Sorensen | H02K 29/12 |
| 2020/0086908 A1* | 3/2020 | Forte | B62D 5/001 |
| 2022/0268600 A1* | 8/2022 | Mote | G01D 11/245 |
| 2022/0334013 A1 | 10/2022 | Hoppe | G01L 5/221 |
| 2022/0371657 A1* | 11/2022 | Gonschorek | B62D 5/0481 |

FOREIGN PATENT DOCUMENTS

| | | | | |
|---|---|---|---|---|
| DE | 102014109473 A1 * | 1/2016 | | F16B 21/18 |
| DE | 102017118457 A1 | 2/2019 | | |
| EP | 1260424 A2 | 11/2002 | | |
| EP | 3182137 B1 | 9/2018 | | |
| EP | 2594915 B1 | 12/2018 | | |
| KR | 102452164 B1 * | 10/2022 | | |
| WO | WO2017216051 A1 | 12/2017 | | |
| WO | WO2018030575 A1 | 2/2018 | | |

* cited by examiner

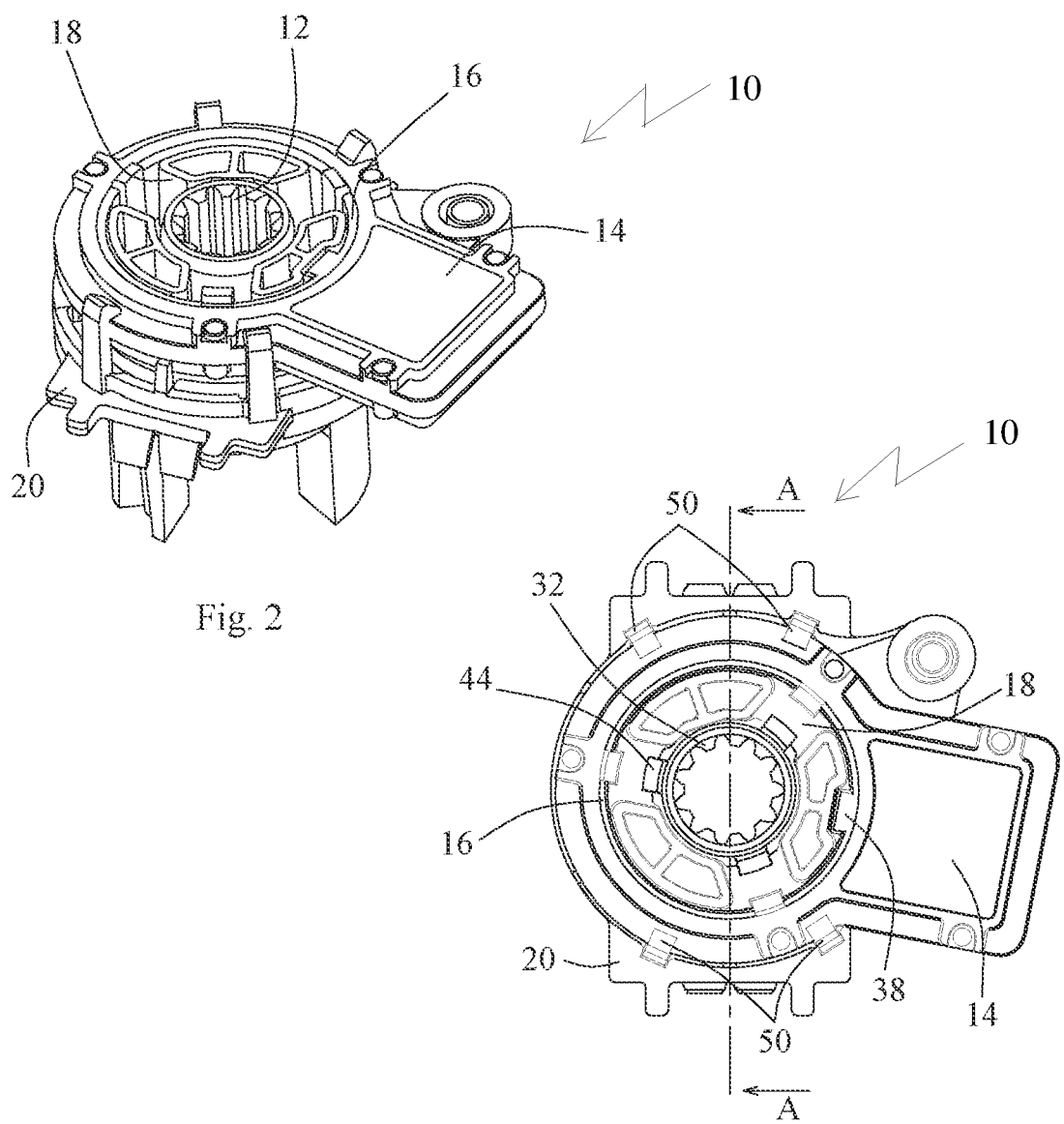

TRACK DEVIATION SENSING MECHANISM

RELATED APPLICATIONS

This application claims priority to European Patent Application No. 20196967.2, filed Sep. 18, 2020, the disclosure of which is hereby expressly incorporated by reference in its entirety.

FIELD OF THE DISCLOSURE

The present disclosure relates to the field detecting degree of rotation of a steering column of a vehicle.

BACKGROUND

Vehicles are steered by changing the orientation of the wheels by rotating the steering column. With the advent of path defining technology, it is required to initially determine a defined path along which the vehicle is required to be driven. The path is defined based on a predefined parameter, such as, obstacles, optimized route, shortest route and the like. Thus, as there is a defined path, there is also a requirement to use a track follow system and mechanism to ensure that the vehicle follows the defined path. In order to maintain the vehicle along the defined path, the track follow system is required to determine the movement of the wheels which is caused by rotation of the steering column. The track follow system calculates any deviation in the path of the vehicle from the defined path determined by the path defining technology. The deviation is either communicated to the operator to manually ensure a course correction or alternatively a controller may receive the deviation to automatically ensure the course correction. Currently, there are several types of sensor arrangement which are used to detect the deviation. However, due to constant play and friction between parts of the sensor as well as mounting arrangement, there are frequent failure issues.

Hence, there is a need for a sensing mechanism for detecting deviation from a defined path which minimizes the drawbacks of the prior art to avoid play between various parts of a sensing mechanism for a steering column. The present disclosure aims to increase the service life of the sensing mechanism for a steering column while facilitating retrofitting onto a steering column.

SUMMARY

According to the present disclosure, a track deviation sensing mechanism for a steering column includes a sleeve, a sensor with a ring, a first part and a second part. The sleeve receives the steering column. The sleeve has an inner wall and an outer wall defining an annular opening. The inner wall defines a plurality of internal splines.

The sensor has a first axial opening. The ring is disposed within the first axial opening. The ring defines a second axial opening for accommodating the sleeve. A key project from the ring towards the first axial opening. The key is integral with the ring. Alternatively, the key is discrete from the ring.

The first part functionally disposed between the sleeve and the ring. The first part is lockingly connected to the sleeve and the ring. The first part has a third axial opening. The first part cooperates with the sleeve by at least one of a snap fit arrangement or an interference fit arrangement. The first part a keyway associated with the key.

The second part locks the sensor and the first part at a prerequisite configuration. The second part has a fourth axial opening. The first axial opening, the second axial opening, the third axial opening, the fourth axial opening and the annular opening are coaxial. The second part cooperates with the sensor and the first part by at least one of a snap fit arrangement or an interference fit arrangement. The second part cooperates with the first part by joining elements. The rotation of the steering column is transmitted to the ring via the first part. The sensor is configured to determine the degree of rotation of the ring and hence the degree of rotation of the steering column. The first part and the second part are made of at least one of a polymeric material, a composite material and a metal.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein:

FIG. 2 illustrates a perspective view of a track deviation sensing mechanism without a steering column arrangement;

FIG. 3 illustrates a top view of a track deviation sensing mechanism of FIG. 2;

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
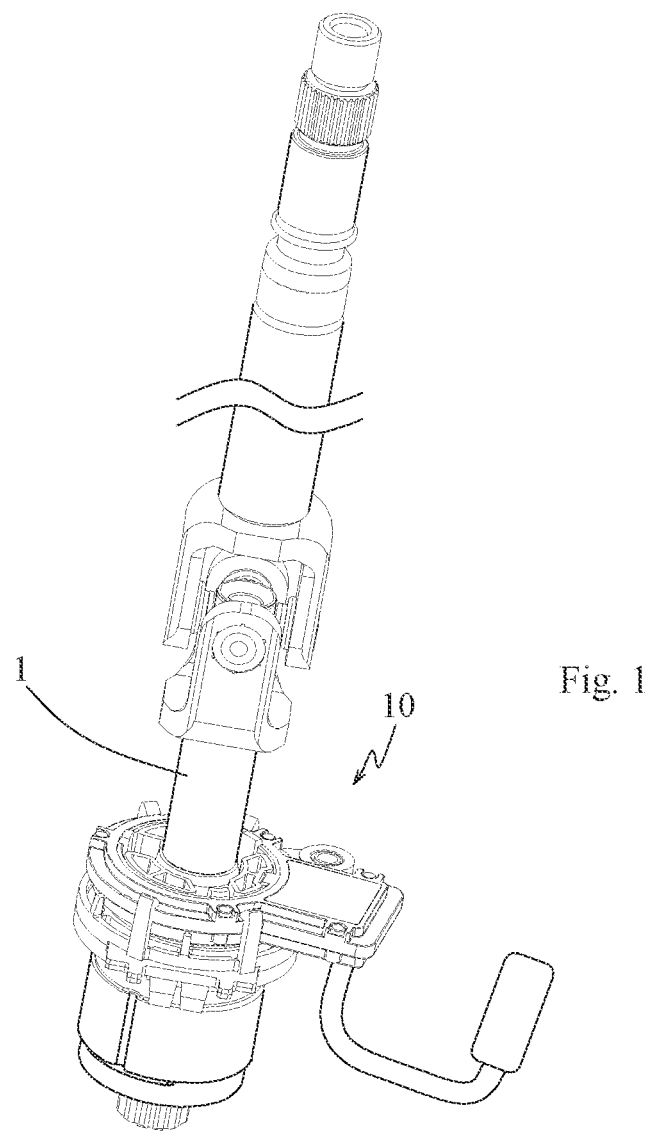
FIG. 1 illustrates a perspective view of a track deviation sensing mechanism with a steering column arrangement.
Figure 4:
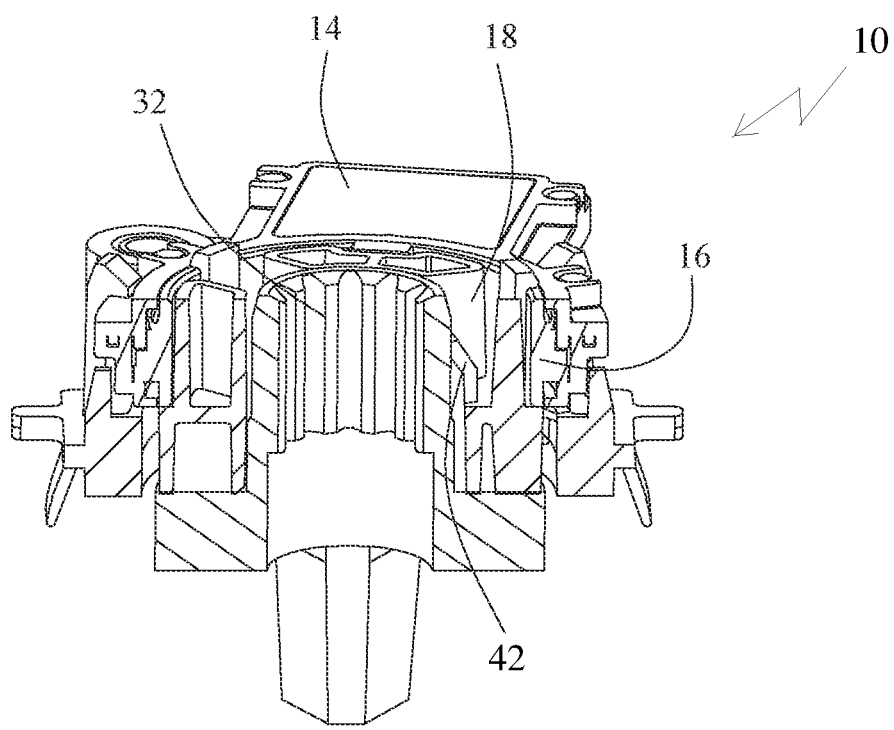
FIG. 4 illustrates a sectional view of a track deviation sensing mechanism of FIG. 3 along the line A-A.

FIG. 1 illustrates a steering column 1 of a vehicle cooperating with a track deviation sensing mechanism 10, in accordance with the present disclosure, through a sleeve 12. FIG. 2 to FIG. 5 illustrates the sleeve 12 of the steering column 1, a sensor 14, a ring 16, a first part 18 and a second part 20. The sensor 14 has not been described in detail. The sensor 14 works in the same way as known sensors for detecting rotation of a steering column 1. The sensor 14 has a first axial opening 22.

Figure 5:
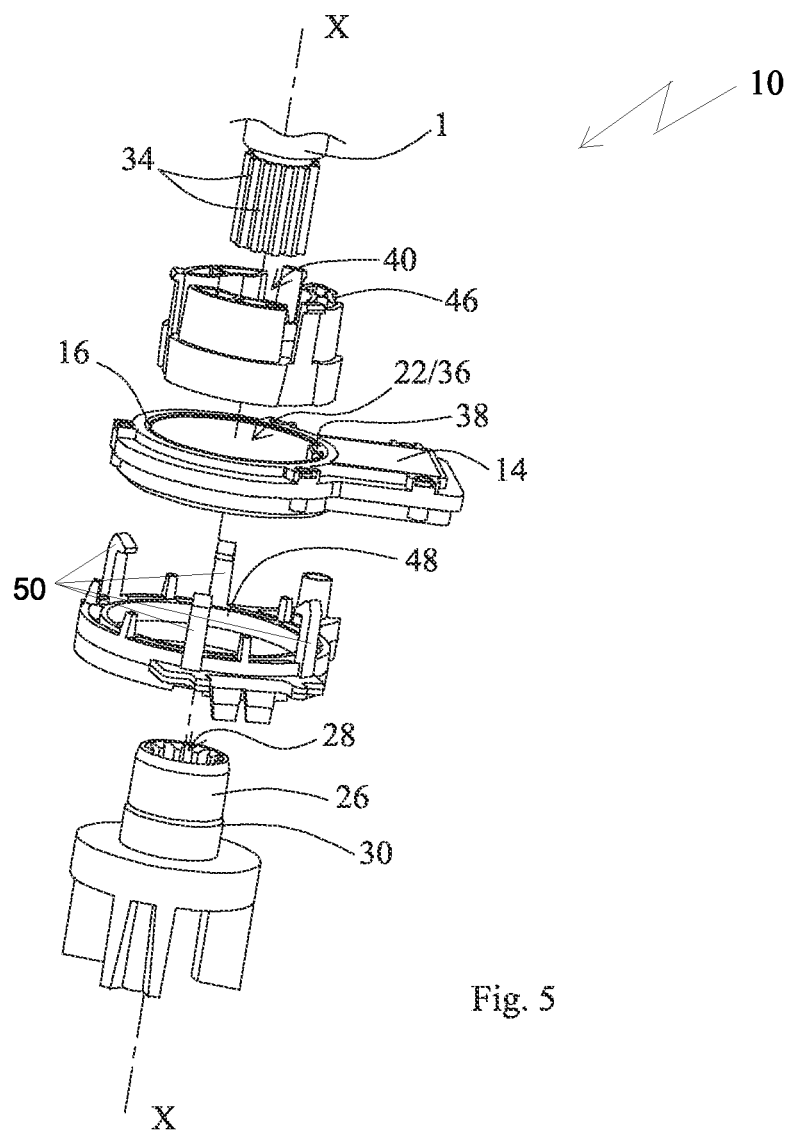
FIG. 5 illustrates an exploded view of a track deviation sensing mechanism of FIG. 2.

Referring to FIG. 2 and FIG. 5, the sleeve 12 has an inner wall 24 and an outer wall 26. The inner wall 24 defines an annular opening 28 with a locking edge 30. The inner wall 24 has a plurality of internal splines 32. The steering column 1 cooperates with the internal sleeve 32 through a plurality of complementary splines 34, defined on an external wall of the steering column 1. With rotation of the steering column 1, the sleeve 12 is caused to rotate due to the splined connection between them.

Referring to FIG. 2 to FIG. 5, the sensor 14 includes the ring 16 which is disposed within the first annular opening 22. The operation of the ring 16 with respect to the sensor 14 operates in a known way. While the sensor 14 is fixed at a predetermined position and is restricted to have any rotational or axial movement, the ring 16 is free to rotate with respect to the sensor 14. However, similar to the sensor 14, the ring 16 is also restricted to have any axial movement. The ring 16 defines a second axial opening 36. The ring 16 includes one or more key 38. The key 38 is a projection which radially extends towards the second axial opening 36. The key 38 may be integral with the ring 16. Optionally, the key 38 is discrete from the ring 16.

Again, referring to FIG. 2 to FIG. 5, the first part 18 is disposed between the sleeve 12 and the ring 16. The first part 18 has a third axial opening 40. The first part 18 has a plurality of projection 42 with a hook 44 defined at the end thereof. Alternatively, the hook 44 may be a bead or a bump. The plurality of projection 42 project towards the center of the third axial opening 40. The projection 42 snap fits onto the locking edge 30 of the sleeve 12. This creates a rigid connection between the sleeve 12 and the first part 18. Thus, the rotational movement of the steering column 1 is transmitted to the first part 18 via the sleeve 12. Optionally, the first part 18 is fitted between the sleeve 12 and the ring 16 by an interference fitting method.

The first part 18, on the surface proximate to the ring 16, has a notch forming a keyway 46. The keyway 46 is profiled to complement the shape of the key 38 of the ring 16. The key 38 of the ring 16 is adjusted to seat on the keyway 46 of the first part 18. The first part is locked to the sleeve 12 by the projection 42 and is also locked to the ring 16 by the key 38. Additionally, the first part 18 may be snap fitted to the ring 16 by one or more snap fitting elements 39. Thus, the rotational movement of the steering column 1 is transmitted to the ring 16 via the sleeve 12 and the first part 18. Since, the ring 16 is freely rotatable with respect to the sensor 14, the degree of rotation of the ring 16 is equal to the degree of rotation of the steering column 1.

The sensor 14 detects the degree of rotation of the ring 16 which corresponds to the degree of rotation of the steering column 1. Thus, on detecting the rotation of the ring 16, the sensor 14 actually detects the degree of rotation of the steering column 1. This degree of rotation of the steering column 1 may be used for providing necessary input to an operator or a controller of the vehicle.

The second part 20 is provided to clamp the sensor 14, the first part 18 and the sleeve 12 in a prerequisite configuration. The first part 18 and the second part 20 are made of a polymeric material. Alternatively, the first part 18 and the second part 20 are made of a composite material or a metal. In accordance with an embodiment, as illustrated in the FIG. 2 to FIG. 5, the second part 20 snap fits onto the sensor 14 by a plurality of snap fitting members 50. The snap fitting arrangement 50 projects towards the center of the fourth axial opening 48. The snap fitting arrangement 50 snap fits onto the sensor 14. Optionally, the second part 20 is fitted to the sensor 14 and to the first part 18 by an interference fit or a joining element not particularly shown in the Figure. This creates a rigid connection between the sensor 14 and the first part 18. Thus, the second part 20 prevents in rigidly connecting the sensor 14 and the first part 18. This prevents play or friction between the first part 18 and the second part 20. The entire assembly of the track deviation sensing mechanism 10 is restricted to be axially displaceable.

The first axial opening 22, the second axial opening 36, the third axial opening 40, the fourth axial opening and the annular opening 28 are coaxial along the axis X. The second part 20 while clamping the sensor 14, encases the sleeve 12, the first part 18 and the ring 16 of the sensor 14 within the fourth axial opening 48. Thus, the track deviation sensing mechanism 10 helps in avoiding any play or friction between the first part 18, the second part 20 and the sensor 14 with the ring 16. Additionally, it helps in increasing service life of the track deviation sensing mechanism for a steering column 1. Further, it facilitates the track deviation sensing mechanism 10 to be retrofittable on a steering column 10. It also reduces overall weight of the track deviation sensing mechanism 10 while minimizing cost of the track deviation sensing mechanism 10.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A track deviation sensing mechanism for a steering column, comprising:
   a sleeve comprising an inner wall and an outer wall, the inner wall defining an annular opening and a plurality of internal splines, wherein the sleeve receives the steering column;
   a sensor comprising a first axial opening;
   a ring disposed within the first axial opening, the ring defining a second axial opening for accommodating the sleeve;
   a first part functionally disposed between the sleeve and the ring, the first part lockingly connected to the sleeve and the ring, wherein the first part comprises a third axial opening; and
   a second part locking the sensor and the first part at a prerequisite configuration, the second part comprising a fourth axial opening, wherein the second part snap fits onto the sensor by a plurality of snap fitting members positioned around the sensor, and wherein the plurality of snap fitting members partially surround the sensor and project towards the center of the fourth axial opening;
   wherein, the first axial opening, the second axial opening, the third axial opening, the fourth axial opening and the annular opening are coaxial.

2. The track deviation sensing mechanism as claimed in claim 1, wherein the first part cooperates with the sleeve by a snap fit arrangement, and wherein a projection of the first part snap fits onto a locking edge of the sleeve.

3. The track deviation sensing mechanism as claimed in claim 1, further comprising at least one key projecting from the ring.

4. The track deviation sensing mechanism as claimed in claim 3, wherein the at least one key is integral with the ring.

5. The track deviation sensing mechanism as claimed in claim 3, wherein the at least one key is discrete from the ring.

6. The track deviation sensing mechanism as claimed in claim 4, wherein the first part defines at least one keyway associated with the at least one key.

7. The track deviation sensing mechanism as claimed in claim 1, wherein the rotation of the steering column is transmitted to the ring via the first part.

8. The track deviation sensing mechanism as claimed in claim 7, wherein the sensor determines the degree of rotation of the ring.

9. The track deviation sensing mechanism as claimed in claim 1, wherein both the first part and the second part include at least one of a polymeric material, a composite material, and a metal.

10. A track deviation sensing mechanism for a steering column, comprising:
 a sleeve comprising an inner wall and an outer wall, the inner wall defining an annular opening and a plurality of internal splines, wherein the sleeve receives the steering column;
 a sensor comprising a first axial opening;
 a ring disposed within the first axial opening, the ring defining a second axial opening for accommodating the sleeve;
 a first part functionally disposed between the sleeve and the ring, the first part lockingly connected to the sleeve and the ring, wherein the first part comprises a third axial opening and a projection projecting towards the third axial opening; and
 a second part locking the sensor and the first part at a prerequisite configuration, the second part comprising a fourth axial opening, wherein the second part snap fits onto the sensor by a plurality of snap fitting members positioned around the sensor, and wherein the plurality of snap fitting members partially surround the sensor and project towards the center of the fourth axial opening;
 wherein, the first axial opening, the second axial opening, the third axial opening, the fourth axial opening and the annular opening are coaxial;
 wherein the first part cooperates with the sleeve via a snap fit arrangement, and wherein the projection of the first part snap fits onto a locking edge of the sleeve.

11. The track deviation sensing mechanism as claimed in claim 10, further comprising at least one key projecting from the ring.

12. The track deviation sensing mechanism as claimed in claim 10, wherein the rotation of the steering column is transmitted to the ring via the first part.

13. The track deviation sensing mechanism as claimed in claim 12, wherein the sensor determines the degree of rotation of the ring.

14. A track deviation sensing mechanism for a steering column, comprising:
 a sleeve comprising an inner wall and an outer wall, the inner wall defining an annular opening and a plurality of internal splines, wherein the sleeve receives the steering column;
 a sensor comprising a first axial opening;
 a ring disposed within the first axial opening, the ring defining a second axial opening for accommodating the sleeve;
 a first part functionally disposed between the sleeve and the ring, the first part lockingly connected to the sleeve and the ring, wherein the first part comprises a third axial opening;
 a second part locking the sensor and the first part at a prerequisite configuration, the second part comprising a fourth axial opening, wherein the second part snap fits onto the sensor by a plurality of snap fitting members positioned around the sensor, and wherein the plurality of snap fitting members partially surround the sensor and project towards the center of the fourth axial opening; and
 a key integrally projecting from the ring;
 wherein, the first axial opening, the second axial opening, the third axial opening, the fourth axial opening and the annular opening are coaxial;
 wherein the first part defines at least one keyway associated with the key.

15. The track deviation sensing mechanism as claimed in claim 14, wherein a rotational movement of the steering column is transmitted to the ring via the first part.

16. The track deviation sensing mechanism as claimed in claim 15, wherein the sensor detects a degree of rotation of the ring.

* * * * *